United States Patent [19]

Morris

[11] Patent Number: 5,530,751
[45] Date of Patent: Jun. 25, 1996

[54] EMBEDDED HIDDEN IDENTIFICATION CODES IN DIGITAL OBJECTS

[75] Inventor: Dale C. Morris, Menlo Park, Calif.

[73] Assignee: Hewlett-Packard Company, Palo Alto, Calif.

[21] Appl. No.: 269,807

[22] Filed: Jun. 30, 1994

[51] Int. Cl.⁶ ........................................... H04L 9/00
[52] U.S. Cl. ............................................................ 380/4
[58] Field of Search ............................................ 380/4, 25

[56] References Cited

U.S. PATENT DOCUMENTS

| | | | |
|---|---|---|---|
| 3,609,697 | 9/1971 | Blevins et al. | 380/4 |
| 4,120,030 | 10/1978 | Johnstone | 380/4 |
| 4,658,093 | 4/1987 | Hellman | 380/4 |
| 5,208,853 | 5/1993 | Armbruster et al. | 380/4 |
| 5,212,728 | 5/1993 | Glover et al. | 380/4 |
| 5,293,422 | 5/1994 | Loiacono | 380/4 |
| 5,371,792 | 12/1994 | Asai et al. | 380/4 |
| 5,398,285 | 5/1995 | Borgelt et al. | 380/4 |

FOREIGN PATENT DOCUMENTS

| | | |
|---|---|---|
| 0366381 | 10/1989 | European Pat. Off. . |
| 0418964 | 9/1990 | European Pat. Off. . |
| 0496607 | 1/1992 | European Pat. Off. . |
| 0580367 | 7/1993 | European Pat. Off. . |
| 0589459 | 9/1993 | European Pat. Off. . |
| WO92/16944 | 1/1992 | WIPO . |

*Primary Examiner*—Salvatore Cangialosi
*Attorney, Agent, or Firm*—Howard R. Boyle

[57] ABSTRACT

A method and apparatus for encoding identification information into a stream of digital data representing an object. The digital data representing an object is modified to add embedded identification information into the data. This modification is done such that the resultant changes to the object are not objectionable to the user. By comparing the original digital data to the modified data, the possessor of the original data can recover the embedded identification information. However the identification information is effectively unavailable to anyone not possessing the original data.

8 Claims, 10 Drawing Sheets

| TIME | VALUE |
|---|---|
| 0 | 0 |
| 1 | 0 |
| 2 | 30 |
| 3 | 10 |
| 4 | 40 |
| 5 | 0 |

*FIG. 5*

| SAMPLE # | ORIGINAL VALUE | + | ENCODE VALUE | = | FINAL VALUE |
|---|---|---|---|---|---|
| 0 | 0 | | 0 | | 0 |
| 1 | 0 | | 0 | | 0 |
| 2 | 30 | | 5 | | 35 |
| 3 | 10 | | 2 | | 12 |
| 4 | 40 | | 0 | | 40 |
| 5 | 0 | | 0 | | 0 |

*FIG. 6*

| SAMPLE # | MODIFIED OBJECT | − | ORIGINAL OBJECT | = | NUMBER ENCODED |
|---|---|---|---|---|---|
| 0 | 0 | | 0 | | 0 |
| 1 | 0 | | 0 | | 0 |
| 2 | 35 | | 30 | | 5 |
| 3 | 12 | | 10 | | 2 |
| 4 | 40 | | 40 | | 0 |
| 5 | 0 | | 0 | | 0 |

*FIG. 8*

| SAMPLE # | ORIGINAL VALUE | + | ENCODE VALUE | = | FINAL VALUE |
|---|---|---|---|---|---|
| 0 | 0 | | 1 | | 1 |
| 1 | 0 | | 1 | | 1 |
| 2 | 30 | | 0 | | 30 |
| 3 | 10 | | 1 | | 11 |
| 4 | 40 | | 0 | | 40 |
| 5 | 0 | | 0 | | 0 |

FIG. 9

EMBEDDED HIDDEN IDENTIFICATION CODES IN DIGITAL OBJECTS

BACKGROUND

In the last few years the entertainment industry begun a transformation from being strictly a provider of analog information to a provider of digital information. For example, while phonograph records and prerecorded analog audio tapes were the predominate media for the distribution of music, today the compact disk and digital audio tape (DAT) are the preferred media for distribution. The retail channel for prerecorded products has also begun to change. Where a consumer could only acquire a music or audio product from a retail store in the past, today many other distribution channels are available. Home cable systems provide pay-per-view services to consumers for movies and the like. Satellite systems provide pay-per-view home services also for those without cable. While the cable and satellite systems generally use analog technology, with the advent of direct broadcast satellites (DBS) and newer wide bandwidth fiber cable systems, digital technology will become the predominant technology for entertainment and information distribution. Soon most people will have access to a fiber cable or satellite distribution system capable of sending high quality images and audio on demand. The age of the "information highway" has begun.

One reason for the conversion from analog to digital distribution is that while analog systems degrade the information being transferred, digital systems do not. A commonly understood example of analog technology is the VCR. When a copy of a movie is made from one VCR to another VCR, the image and audio copied is not quite as good as the original. If successive generations of the movie are made from prior generation copies, at some point, the result will be a copy of the movie that is not viewable and the sound track will be very distorted if audible at all.

On the other hand, digital copying is perfect. Every copy will be just as good as the original. For this reason Congress recently passed laws aimed at limiting the ability of a person to make unlimited copes of a prerecorded DATs. However these laws address only the DAT copy issue and not the general issue of copying digital information. Also, it is unlikely that someone making a great deal of money from the illegal copying and distribution of audio and video products will be particularly deterred by an inconvenient law.

The information highway is useful for distributing other information besides movie and music products. For example to transfer high quality still images or a newspaper, the use of a lossless distribution system is highly desirable making a digital distribution system ideal. Since most things a human can see or hear can be converted to digital information, it is useful to think of the digital information as representing an "object". The object may be a still picture, a song or anything else that can be represented digitally. So while the object can easily distributed by a digital highway, the issue of how to protect the object from unauthorized copying remains a significant problem.

The issue of copying is even more of a problem with the information highway than in the past. An object provider will use the information highway to deliver a "perfect" copy of an object, on demand, to a customer. That is the customer will have the object in digital form. Therefore the customer will be able to make unlimited "perfect" copes of the object. An unscrupulous customer (pirate) can then make and sell copes of the object at the expense of the owner of the object. To prevent such copyright infringement, a method and apparatus is needed to allow the owner of an object to distribute the object in digital form while providing a way for the owner to hold an illegal copier accountable.

SUMMARY OF THE INVENTION

The present invention provides a method and apparatus to identify individual copies of a digital object. The apparatus and method operate to mark each copy of the digital object with an identifier before the object is transferred to a customer. This identifier is encoded by making a small delta (difference) between the original object and the copy of the object made. The copy of the object is therefore slightly different from the original object in a known way. This delta is produced by adding or subtracting an encoding number to the original object. Each encoding number may be unique for each copy of the object supplied thereby providing an identifier on the copy which is a serial number. One possible encoding number is a transaction number used by a customer to order the copy. Also the encoding number may identify a particular customer the copy of the object is delivered to.

The difference between a copy of a digital object and the original digital object is the encoded identification number. Therefore if a copy of the digital object is acquired, the possessor of the original digital object can ascertain the identification number used to generate the copy and determine the customer the copy was distributed to.

This new and novel apparatus and method provides the owner of a digital object a tool to use to find customers that are making copies of the digital object without authorization. Since only small changes from the original digital object are made, a customer will still enjoy a high quality product while the owner of the original object retains the ability to protect his ownership rights.

BRIEF DESCRIPTION OF THE INVENTION

FIG. 5 is a chart of the values of the analog signal of FIG. 4 at particular sample times.

FIG. 6 illustrates the process of encoding identification information into a digital object.

FIG. 8. illustrates the method of recovering the embedded identification information from the modified digital object.

Figure 5:
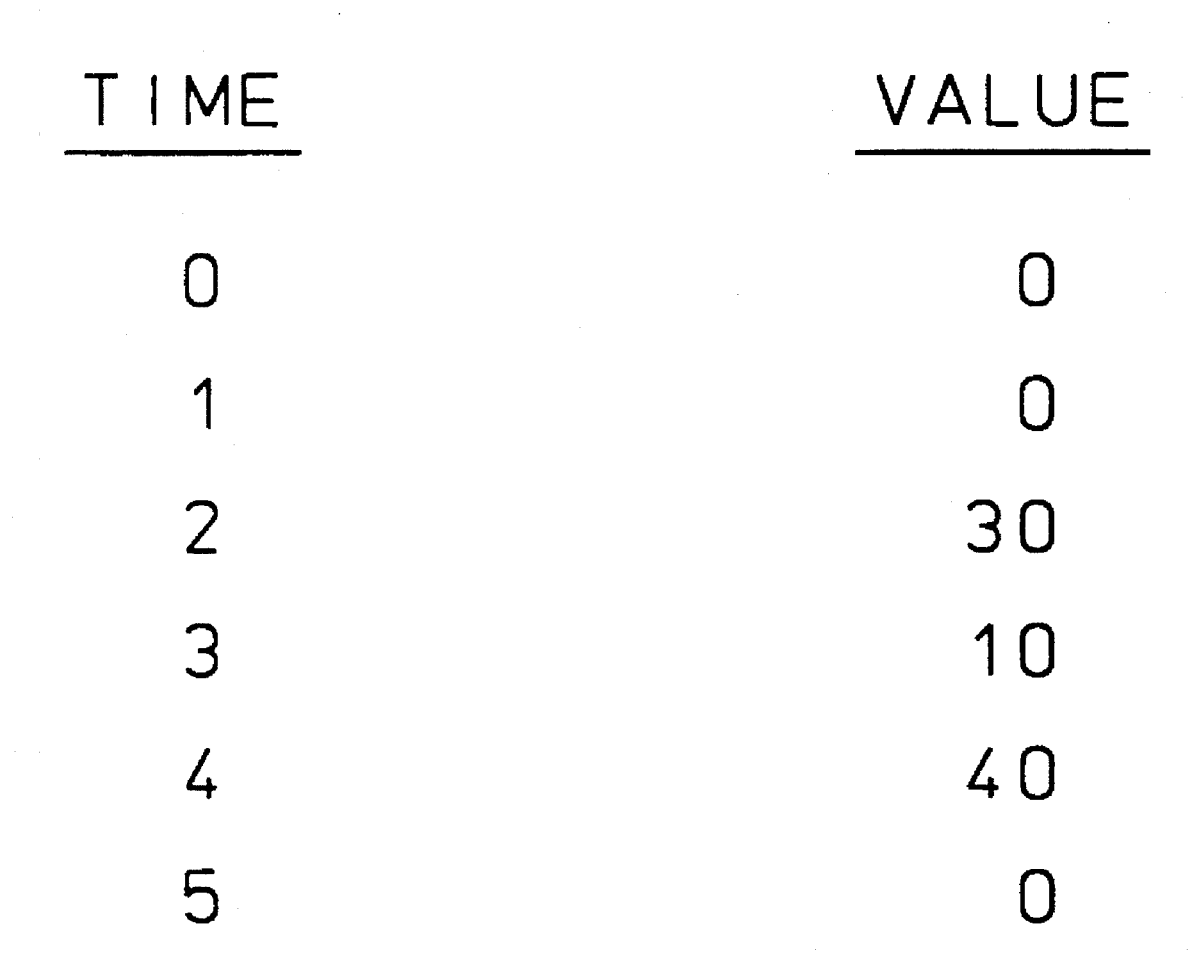

FIG. 9 is a chart of the values of FIG. 5 which have a binary number added to them.

Figure 10:
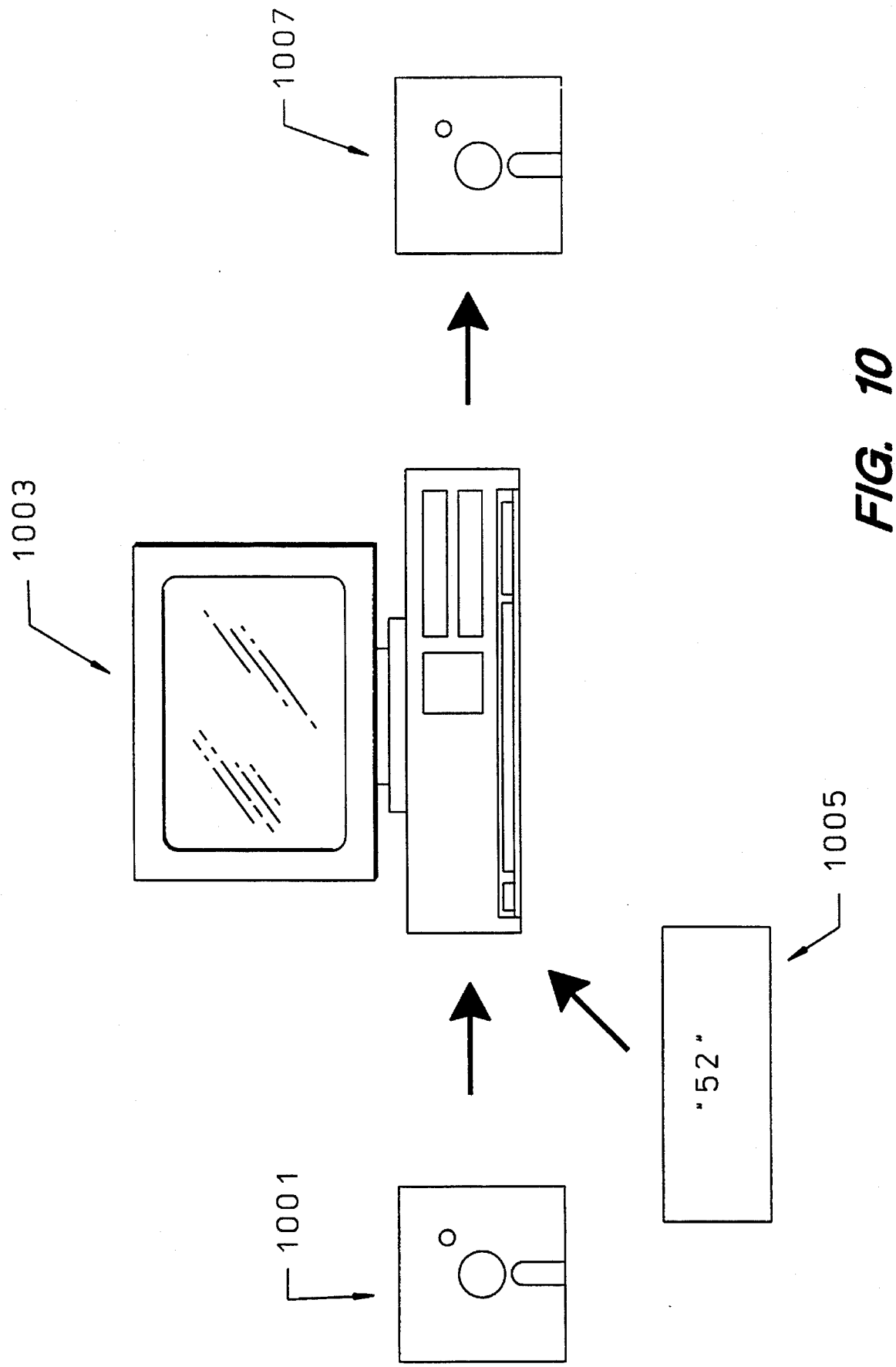

FIG. 10 is a simplified apparatus used to create an encoded digital object.

DETAILED DESCRIPTION OF THE INVENTION

An important assumption with regard to the present invention is that minor changes can be made to the digital object without detracting from its usefulness. For example, when a photograph is digitized, the digital scanner converts the photograph into a series of color dots or pixels. Each pixel is defined as a blend color where the blend color is made up of primary colors with each primary color having a range of intensities. The range of intensities for each color typically ranges from a zero (0) which means this particular color is not used to 255 which means this particular color is the most intense possible (assuming an eight bit digital conversion system).

Figure 1:
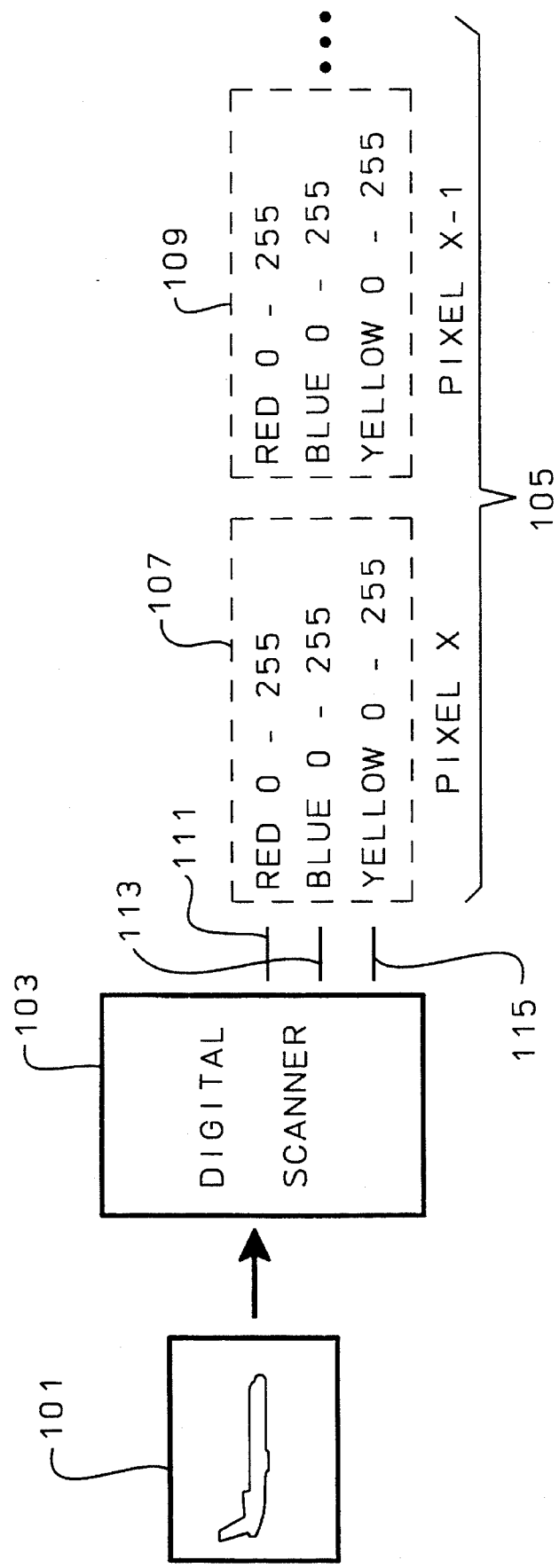
FIG. 1 illustrates a simplified process of converting a physical picture into a digital representation of the picture thereby creating a digital object.

FIG. 1 illustrates a simple case where only the red, blue and yellow primary colors are used. A photograph 101 is scanned by a digital scanner 103 which produces a stream of data 105 which represents a series of pixels of which pixels 107 and 109 are representative. In this example a pixel will have three numbers associated with it. The intensity of the red color, blue color and the yellow color used to makeup the pixel. So pixel 107 has associated with it a red intensity 111, a blue intensity 113 and a yellow intensity 115. While a particular color which makes up a pixel can have 256 or more values of intensity, the human eye cannot distinguish such fine gradations. As a practical matter then, the digitized image is more precise than can be detected by a person.

Also, a digitized picture is made up of tens of thousands of pixels. When the eye views a digitized image, the eye averages or blends groups of pixels together. The human eye is not capable of resolving a high quality digitized image into individual pixels. If a single pixel is deleted from the digitized image, the human eye would not detect the deletion. In like manner, if changes were made to a relatively small number of individual pixels, the changes would be difficult to detect with the unaided eye.

The same issues apply to digitized sound recordings. Instead of pixels, analog sound is sampled at periodic intervals of time and converted into a digital value. This is typically performed by a analog to digital (A/D) converter which performs about 40,000 samples per second.

Figure 2:
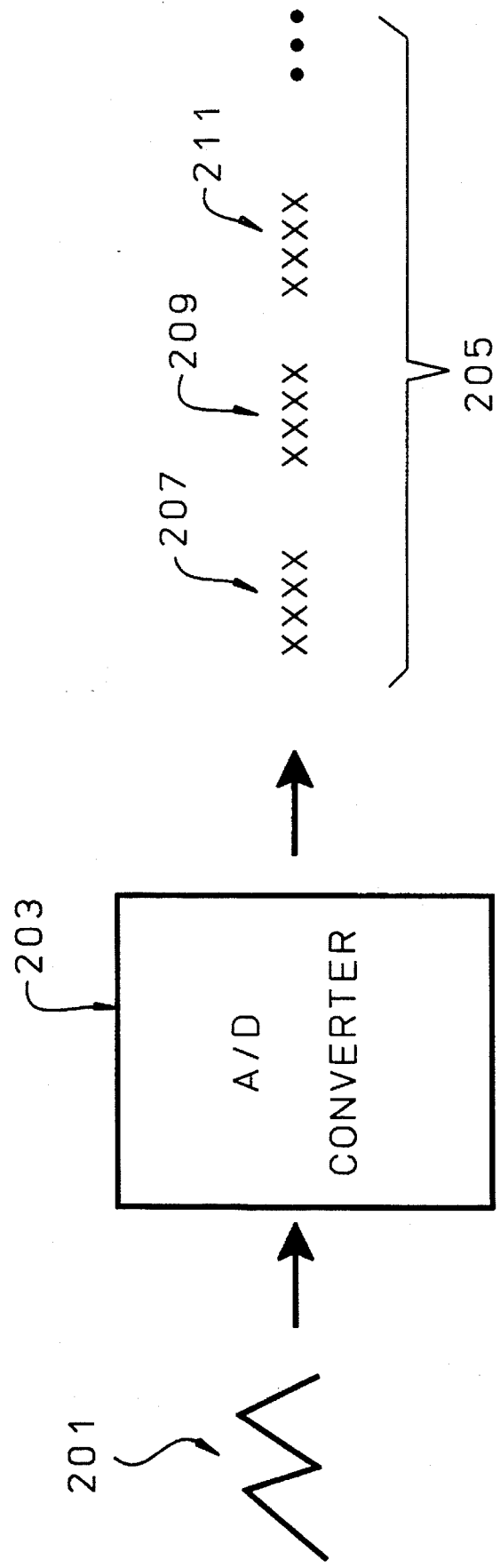
FIG. 2 illustrates a simplified process of converting sound signal into a digital data stream which comprises a digital object.

FIG. 2 illustrates the process of converting an analog sound into digital data. A sound signal 201 is sampled by an A/D converter 203 which outputs a stream of digital data 205 which consists of individual sample values of which samples 207–211 are representative. Often each sample is represented by a 16 bit digital number. Therefore each sample can have a sound intensity value between zero (0) and 65535. The human ear cannot detect the fine difference between the sound value of 64000 and 64001 and therefore the digital sound is more precise than typically required. Also, if a relatively small number of samples were changed, it would be difficult or impossible to detect the changes with the unaided ear. So for most purposes, a digital object (digitized picture or sound) is more precise than generally needed.

This over precision is exploited to encode identification information into the object under the principle that when a modified digital object is viewed or heard, the relatively minor changes made to encode the identification information is unnoticed by the user of the digital object. However the changes introduced are sufficient to enable the owner of the digital object to compare the modified object to the original and thereby recover the identification information.

Figure 3:
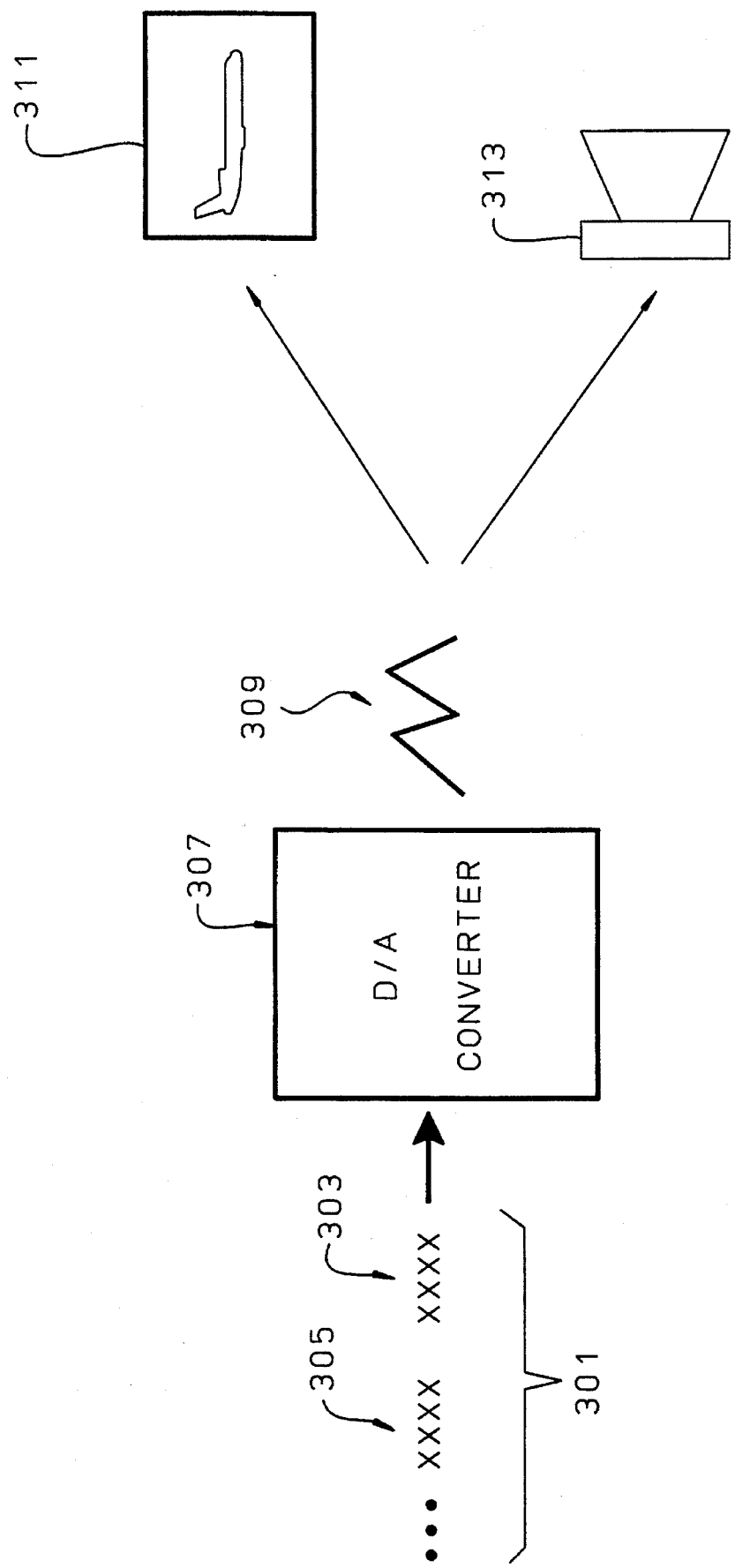
FIG. 3 illustrates a simplified process of converting a digital stream of data comprising a digital object into an analog form.

FIG. 3 illustrates the process for converting a digitized object back into analog form such that it can be perceived by the human ear or eyes. A digital sample stream 301, consisting of individual samples 303 and 305, is fed into a digital to analog converter 307 which converts the samples 301 into an analog signal 309. This analog signal is utilized to drive a video monitor 311 or audio speaker 313 as is well known in the art.

Figure 4:
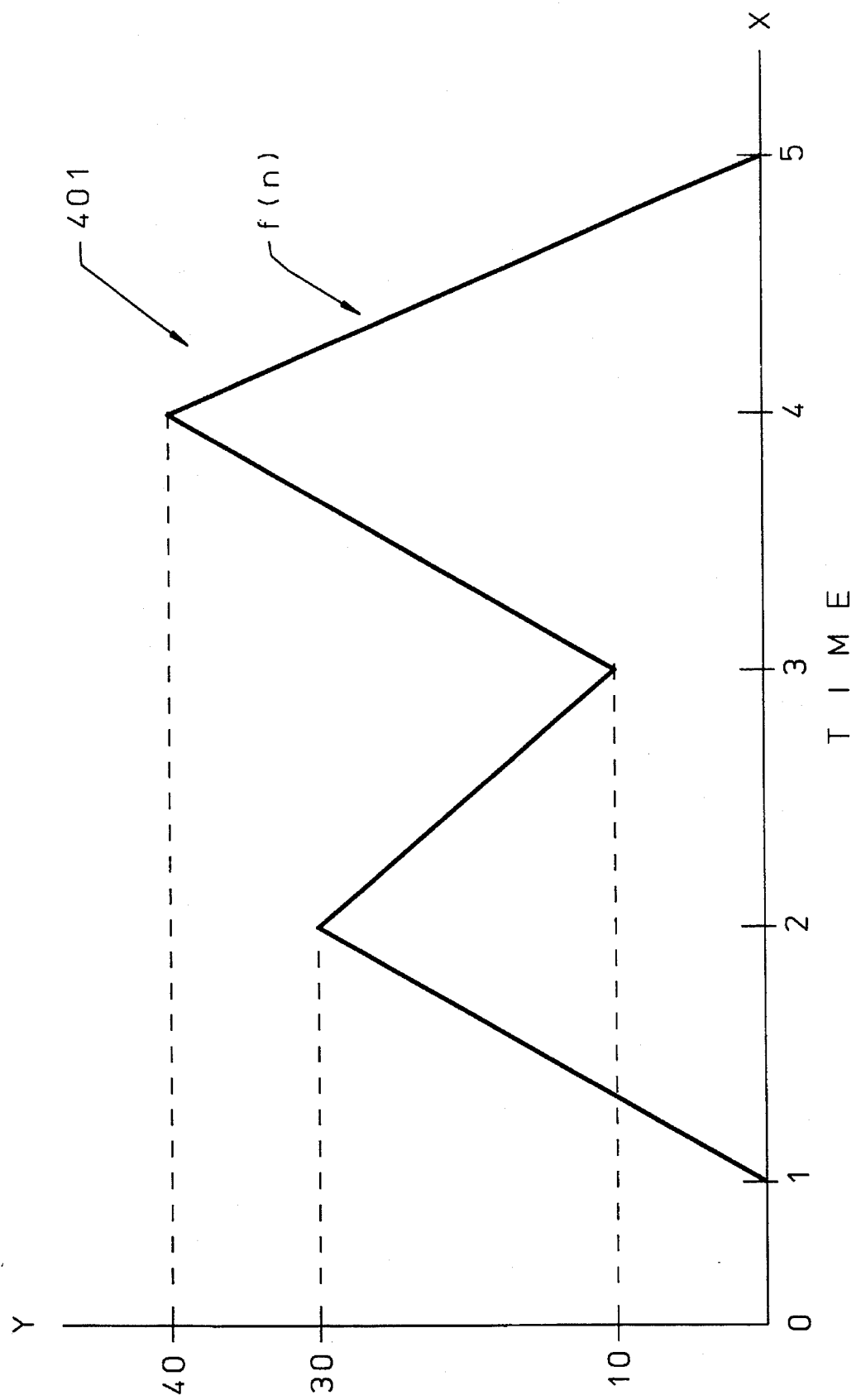
FIG. 4 illustrates a segment of an analog signal having particular values at particular sample times.

FIG. 4 illustrates a segment of an analog signal f(n) that makes up an analog object. For example, this analog object could be a sound track. The segment of the analog object depicted 401 has different values at different periods of time. So a sample of the f(n) signal taken at time 2 indicates the signal has a value of 30. At time 3 the signal has a value of 10 and so on. FIG. 5 is a chart of the values of the f(n) signal taken at times 0–5 such as would be generated by a analog to digital converter sampling the f(n) signal 6 times at the indicated times. The values in the chart represent the digital equivalent of the analog f(n) signal and combined with other samples of the analog signal, not shown, comprise a digital object.

This digital object can be distributed to customers in many physical forms such as by magnetic tape, compact disk or any other digital distribution media. As previously discussed, once in a digital form the digital object is easily copied with no loss in quality. So to encode a identification code into the digital object the values which comprise the digital object are modified.

FIG. 6 illustrates the process of modifying the digital object to encode an identification code. As illustrated, an identification code of "005200" is encoded into the digital object by adding the digits of the identification code to the particular values of the digital object. For example, sample 2 of the original digital object is "30" and has added to it the third digit of the identification code which is "5" to create a final value of "35". In like manner sample 3 which has a value of "10" has the forth digit of the identification code "2" added to it to create a final value of "12". By this process a modified digital object is created which has the identification number encoded into it. This modified digital object is distributed to a customer in digital form.

Figure 7:
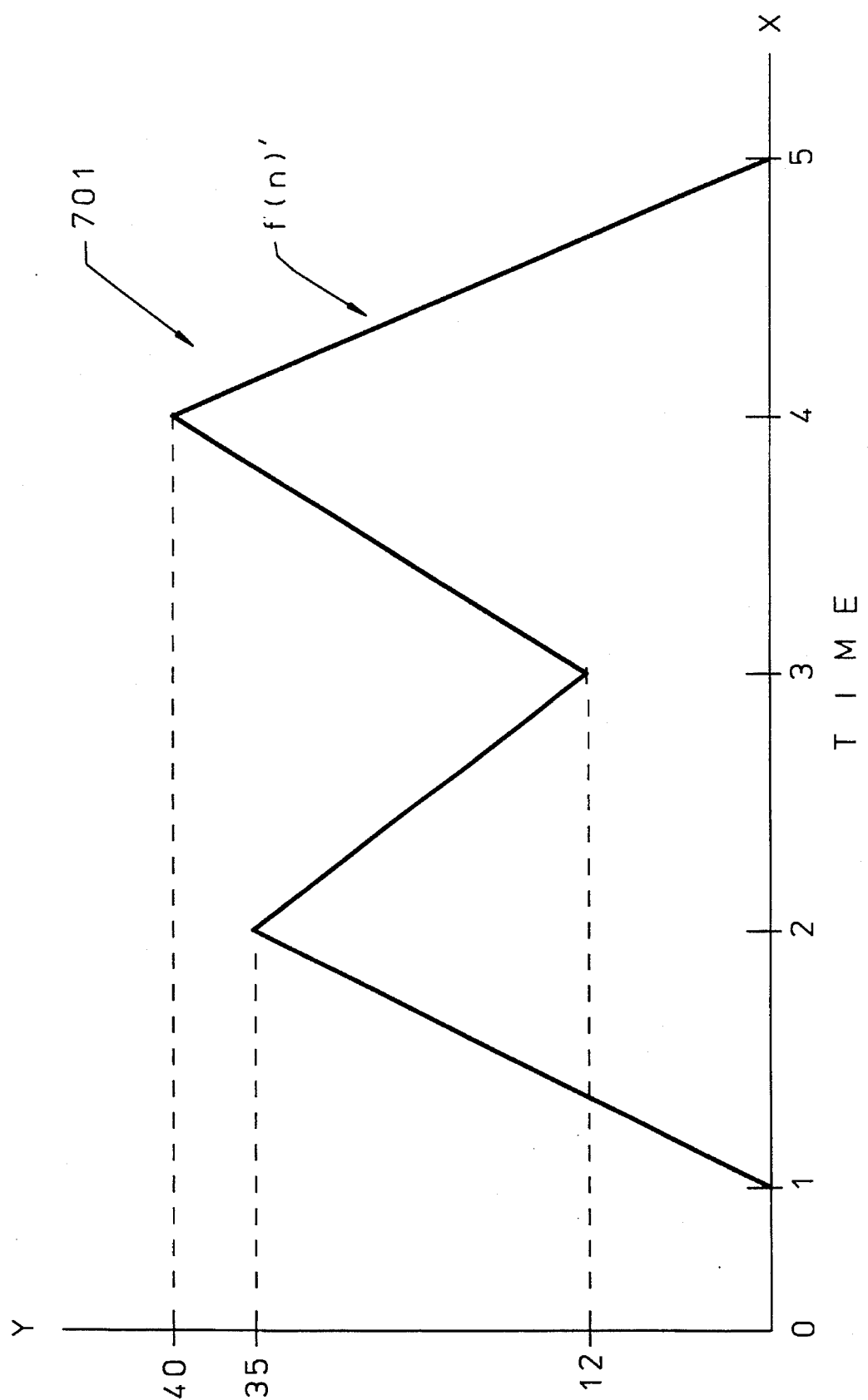
FIG. 7 illustrates an analog representation of the encoded digital object of FIG. 6.

FIG. 7 illustrates the result when the modified digital object is converted in analog form by the customer. The modified digital object is converted into a modified analog signal f(n)' 701. This signal f(n)' 701 is different from the original signal f(n) 401 because of the changes made to encode the identification information. So while the original signal has the values of "30" and "10" at times 2 and 3 respectively, at the same sample times the modified signal has the values "35" and "12". This modification of the original signal is sufficient to encode the desired information but represents an insignificant and virtually undetectable change to the object. If the original signal was a sound track sampled 40,000 times per second, the change effects 1/20,000 of one second of audio.

While the example described modified consecutive samples to encode identification information, other encoding schemes are advantageously utilized. For example instead of consecutive samples being changed, the modifications can be distributed by skipping samples and encoding the identification information by changing every 20,000th sample. Generally the more distributed the modifications, the less noticeable the modifications are. Also, multiple copes of the identification information or an error correcting code can be encoded into the modified digital object to allow for recovery of the information even if there has been some corruption of the data.

Once a copy of the modified digital object is obtained, the identification information is recoverable by comparing the modified digital object to the original digital object. FIG. 8 illustrates this recovery process. Each of the six samples (0–5) of the modified object are compared to the same six samples of the original digital object. The process works by subtracting the value of the original sample from the value of the modified sample. By doing this subtraction on a sample by sample basis, the difference is found to be "005200". This difference value is the identification information encoded into the digital object as described in association with FIG. 6. This information may indicate that the modified digital object was given to customer "52".

To further distribute the encoding such that the changes are even more difficult to detect, the identification number can be converted to a binary number and each binary bit added to a single sample. In this way an individual sample will be changed by at most one bit.

FIG. 9 illustrates how a binary number is encoded into a data stream. If the data to be encoded is "52" decimal, the number 52 is converted into a binary number which is "110100". So if the binary values are added to the original values obtained from f(x) in FIG. 4, the final values are very close to the original values. For samples 0–5, the final values are 1, 1, 30, 11, 40 and 0 respectively. The final values are so close to the original values that the changes are extremely hard to detect especially in an object having millions of samples.

Physical objects can have a serial number plate or like identification means attached to them in such a way that removal is very difficult. Unfortunately digital objects are easy to edit and so a serial number added to the digital object such that it is easy to detect can be deleted by a pirate. The present invention makes it hard to detect the encoded information as generally the digital object is huge relative to the encoded information which creates a needle-in-the-haystack problem for a copier intent on finding the encoded information.

While the method used to encode and recover the identification information has been illustrated using simple addition and subtraction, more complex encoding and decoding algorithms are also useful without departing from the beneficial teachings of this invention. For most objects, the encoding and decoding process is advantageously automated by using a computer or like apparatus to modify or compare the samples given the large number of samples a digital object will typically contain.

FIG. 10 illustrates the apparatus to create an encoded copy of a digital object. The original digital object stored on a disk 1001 or like digital media is read by a digital computer 1003 along with the information to be encoded 1005 entered by a keyboard or other data input device. The computer combines the original object data with the information to be encoded and stores the resultant data onto a distribution media 1007. This distribution media is sent to the customer for his use. Of course instead of distributing physical media, a digital network or other transmission means can be utilized. This method and apparatus allows the distribution of digital objects to customers while allowing only the possessor of the original digital object to recover the encoded information.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

I claim:

1. An apparatus implemented in a programmable machine for creating a modified digital object and for recording said modified digital object on a digital storage medium, said apparatus encoding an identification number, into a copy of an original digital object that is recorded on an original storage medium to create said modified digital object, where the identification number includes at least one discrete value, and where the original digital object and the copy of the digital object consist of a plurality of discrete values, said apparatus comprising:

a combiner operative to combine a first discrete value of the identification number with a first discrete value of the digital object thereby creating a first modified value, wherein said first modified value is temporarily stored in a first temporary storage medium, a copier operative to make a copy of the original digital object, wherein said copy is temporarily stored in a second temporary storage location, a modifier operative to substitute the first modified value for a discrete value in the copy of the original digital object that corresponds to the first discrete value in the original digital object and for recording the copy of the original digital object with the substituted modified value on said digital storage medium as said modified digital object having said encoded identification number embedded within it.

2. An apparatus as in claim 1 wherein:

the identification number has a plurality of discrete values;

the combiner operates to combine the plurality of discrete values of the identification number with a plurality of discrete values of the original digital object creating a plurality of modified values; and the modifier operates to substitute the plurality of modified values for the plurality of discrete values in the copy of the original digital object that correspond to the plurality of discrete values in the original digital object that were combined with values from the identification number.

3. An apparatus as in claim 2 wherein the identification number is comprised of a plurality of digits, in a particular number base, and each digit is a discrete value.

4. An apparatus as in claim 3 wherein the digits of the identification number are binary digits and each binary number is a discrete value of the identification number.

5. An apparatus as in claim 1 wherein:

the combiner is operative to combine a first discrete value of the identification number with a second discrete value of the digital object thereby creating a second modified value; and the modifier is operative to substitute the second modified value for a discrete value, in the copy of the original digital object, that corresponds to the second discrete value in the original digital object;

whereby the copy of the original digital object with the substituted first and second modified values constitutes a modified digital object having an encoded identification number embedded within it a plurality of times.

6. An apparatus implemented in a programmable machine for recovering an embedded identification number from within a modified digital object that is recorded on a digital storage medium comprising:

said modified digital object created by:

a. utilizing a combiner operative to combine a discrete value of an identification number with a discrete value of an original digital object that is recorded on an original storage medium and thereby create a first modified value, wherein said first modified value is temporarily stored in a first temporary storage medium; and b. utilizing a copier operative to make a copy of the original digital object, wherein said copy is temporarily stored in a second, and c. utilizing a modifier operative to substitute the first modified value for a discrete value of the copy of the original digital object that corresponds to the first discrete value in the original digital object and to record the copy of the original digital object with the substituted modified value on said digital storage medium as said modified digital object having said embedded identification number; and an extractor operative to receive a value from the modified digital object recorded on said digital storage medium and to receive a value from the original digital object recorded on said original storage medium; and the extractor is operative to recover the identification number embedded within the modified digital object recorded on said digital Storage medium to uniquely identify said modified digital object.

7. An apparatus as in claim 6 wherein:

the extractor subtracts a value of the original digital object from a value of the modified digital object if the combiner added a value of the identification number to a value of the original digital object; and the extractor subtracts a value of the modified digital object from a value of the original digital object if the combiner subtracted a value of the identification number to a value of the original digital object.

8. An apparatus as in claim 6 wherein:

the combiner combines a plurality of discrete values of an identification number with a plurality of discrete values of the original digital object thereby creating a plurality of modified values;

the modifier operates to substitute the plurality of modified values for a plurality of discrete values in the copy of the digital object that correspond to the plurality of discrete values in the original digital object that were combined with values from the identification number; and the extractor is operative to recover the identification number values embedded within the modified digital object.

* * * * *